(12) United States Patent
Galbreath

(10) Patent No.: US 6,254,019 B1
(45) Date of Patent: Jul. 3, 2001

(54) FOOD PROCESSOR

(76) Inventor: John Alexander Galbreath, 2516 Chestnut Woods Ct., Reisterstown, MD (US) 21136

( * ) Notice: Subject to any disclaimer, the term of this patent is extended or adjusted under 35 U.S.C. 154(b) by 0 days.

(21) Appl. No.: 09/154,307

(22) Filed: Sep. 16, 1998

(51) Int. Cl.$^7$ .................................................. B02C 19/00
(52) U.S. Cl. ................. 241/100; 241/199.9; 241/199.11; 241/199.12; 241/282.1
(58) Field of Search ................................. 241/37.5, 100, 241/199.9, 199.11, 199.12, 282.1

(56) References Cited

U.S. PATENT DOCUMENTS

| | | | |
|---|---|---|---|
| 4,113,188 | 9/1978 | Belinkoff | 241/37.5 |
| 4,117,980 | 10/1978 | Hartmann | 241/37.5 |
| 4,600,159 | 7/1986 | Akesson | 241/280 |
| 4,708,489 | 11/1987 | Carlson | 366/149 |
| 4,878,627 | 11/1989 | Otto | 241/199.12 |
| 5,104,050 | 4/1992 | Herbert | 241/37.5 |
| 5,580,007 | 12/1996 | Caviezel | 241/199.12 |
| 5,645,346 | 7/1997 | Thuna | 366/205 |
| 6,012,660 | * 1/2000 | Colman | 241/30 |

* cited by examiner

*Primary Examiner*—Allen Ortega
*Assistant Examiner*—William Hong

(57) ABSTRACT

The invention is a food processor with a blade that moves up and down while rotating, for improved comminuting action. An additional, more general field of this invention is in the area of transmission mechanisms, specifically a mechanism that adds up-and-down motion to rotational motion. The mechanism includes a lifting element which is coupled to the drive shaft and which is also free to move up and down along the shaft. The blade is attached to the lifting element. A cylinder is fixed to the main body of the processor. A thread forms a continuous loop inside the cylinder, beginning at the bottom of the cylinder, extending in a spiral fashion to the top of the cylinder, and returning in a reverse spiral fashion to the bottom of the cylinder. The lifting element fits inside the cylinder, and has a post and a member located thereon. The post and member on the lifting element fit into the thread on the cylinder. The rotating action of the lifting element influences the post and member, and thus the lifting element and blade, to move upward along the cylinder thread. As the lifting element rotates past its highest position, the post and member move downward along the cylinder thread, causing the lifting element and blade to move downward as well. This up-and-down action repeats itself with subsequent rotations of the drive shaft. Thus, the blade moves repeatedly up and down while rotating, improving the comminuting action of the processor.

14 Claims, 9 Drawing Sheets

FOOD PROCESSOR

BACKGROUND—Cross-References to Related Applications

Not applicable; omitted.

BACKGROUND—Field of Invention

This invention is in the area of food processors, specifically a food processor with a blade that moves up and down while rotating, to improve the comminuting action of the processor. An additional, more general field of this invention is in the area of transmission mechanisms, specifically a mechanism that adds up-and-down motion to rotational motion.

BACKGROUND—Discussion of Prior Art

Food processors are well known in the art, an early example being U.S. Pat. No. 4,113,188 to Belinkoff. Most of these devices employ a motor-driven blade, which rotates to comminute the material.

A major problem with these devices, however, is that the rotating action of the blade pushes the material being comminuted up above the blade path. Often, the material remains stuck there, held up above the blade as the blade rotates. To achieve satisfactory comminution, the user is forced to shut off the processor, remove the cover of the comminuting chamber, manually push the uncomminuted material back down into the blade path, and then restart the processor. This procedure is time-consuming and tedious.

Various approaches have been taken to address this problem. Multiple blades at different vertical levels, as disclosed in U.S. Pat. No. 4,878,627 to Otto, constitute one approach. However, the multiply-bladed shaft protrudes obtrusively through the center of the comminuting chamber, and takes up significant room in the chamber.

Devices that allow the blade to move up and down within the comminuting chamber, simultaneous with manual or motor-driven rotation, are shown in U.S. Pat. No. 4,117,980 to Hartmann, U.S. Pat. No. 4,708,489 to Carlson, U.S. Pat. No. 5,104,050 to Herbert, and U.S. Pat. No. 5,580,007 to Caviezel. However, all of these devices require a manual input to deliver the up-and-down motion. They are not "automatic", and so are not convenient to use.

Devices that deliver motor-driven up-and-down motion along with motor-driven rotational motion are not common. An example is disclosed in U.S. Pat. No. 4,600,159 to Akesson, but the mechanism employed therein is complex, bulky, and more suitable for industrial applications than for kitchen food processors.

U.S. Pat. No. 5,645,346 to Thuna discloses a blender that employs a waveform ramp to add up-and-down motion to rotational motion. However, this device has some key disadvantages. First, the amount of up-and-down motion delivered is not very great. It is limited to the amplitude of the wave in the waveform ramp, and is more of an oscillation than a significant up-and-down motion. Unless the diameter of the waveform ramp is quite large, or the ramp quite steep, the amount of up-and-down motion delivered will not be large enough to address the problem mentioned at the beginning of this section.

Further, the mechanism employed is complex and has a large number of separate parts. For example, a set of reduction gears is necessary to slow down the oscillation; otherwise, the blade would vertically oscillate twice during every rotation. A spring is also necessary in the preferred embodiment, to force the guide to follow the descending portion of the waveform ramp.

Last, the mechanism employed is not very compact. The amount of additional height needed for the mechanism is significantly greater than the amount of vertical oscillation generated. Compactness is an important consideration in most kitchen appliances, and this mechanism would not make for a very compact food processor.

In sum, a food processor with a blade having a significant amount of motor-driven up-and-down motion, delivered simultaneously with motor-driven rotational motion via a compact mechanism, would be a great improvement over prior art processors.

OBJECTS AND ADVANTAGES

Accordingly, several objects and advantages of my invention are:

It has improved comminuting action, yielding a more uniform mix and producing pieces with a more consistent size.

It makes for faster comminuting—the material being comminuted does not remain stuck above the blade path; thus the user doesn't have to open the comminuting chamber every so often to push material back down into the blade path.

The basic elements of the invention can be implemented in blenders, grinders, etc., and can be used not just in food preparation, but in any device having comminuting, mixing, or blending action.

The mechanism that adds up-and-down motion to rotational motion is of simple construction, and is easy to manufacture. It may be made from several different materials, depending on whether it will be used for light or heavy duty operation. Its threaded cylinder construction is flexible-the number of up-and-down motions per blade rotation can be varied simply by varying the thread pitch on the threaded cylinder.

The mechanism that adds up-and-down motion to rotational motion may also be contained within a separate, free-standing assembly, to facilitate installation into food processors or other devices.

It is much easier and faster to use than prior art processors requiring a manual input to deliver up-and-down motion.

It delivers a greater amount of up-and-down motion than the prior art blender employing a waveform ramp.

It is simpler and more compact than the prior art blender employing a waveform ramp. The amount of additional height needed for the mechanism is about the same as the amount of up-and-down motion generated.

Further objects and advantages of my invention will become apparent from a consideration of the drawings and ensuing description.

SUMMARY

My invention is a food processor with a blade that moves up and down while rotating, thereby improving the comminuting action of the processor.

DESCRIPTION—Main Embodiment

Figure 1:
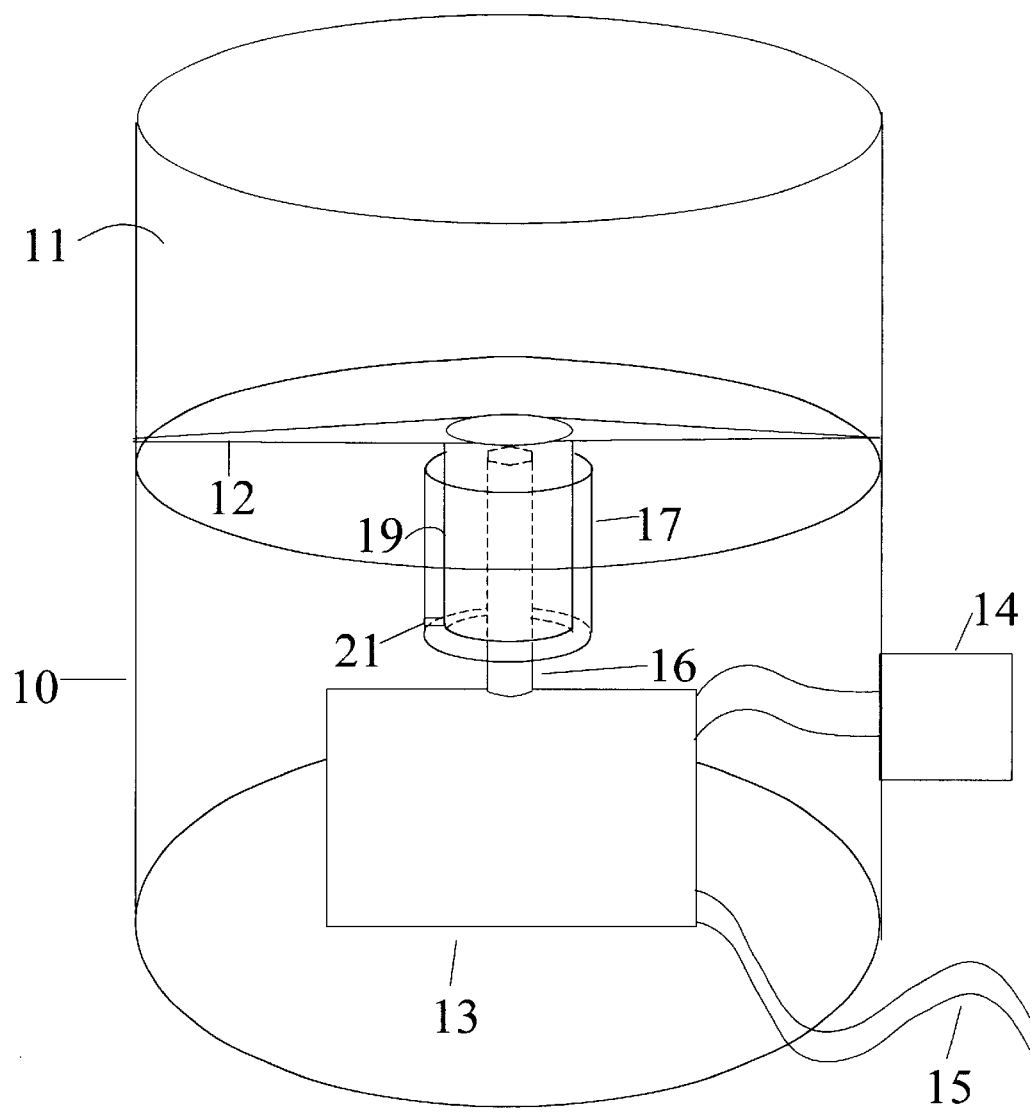
FIG. 1 illiustrates the food processor (blade in "down" position), with a cutaway view of the mechanism that adds up-and-down motion to rotational motion.
Figure 2:
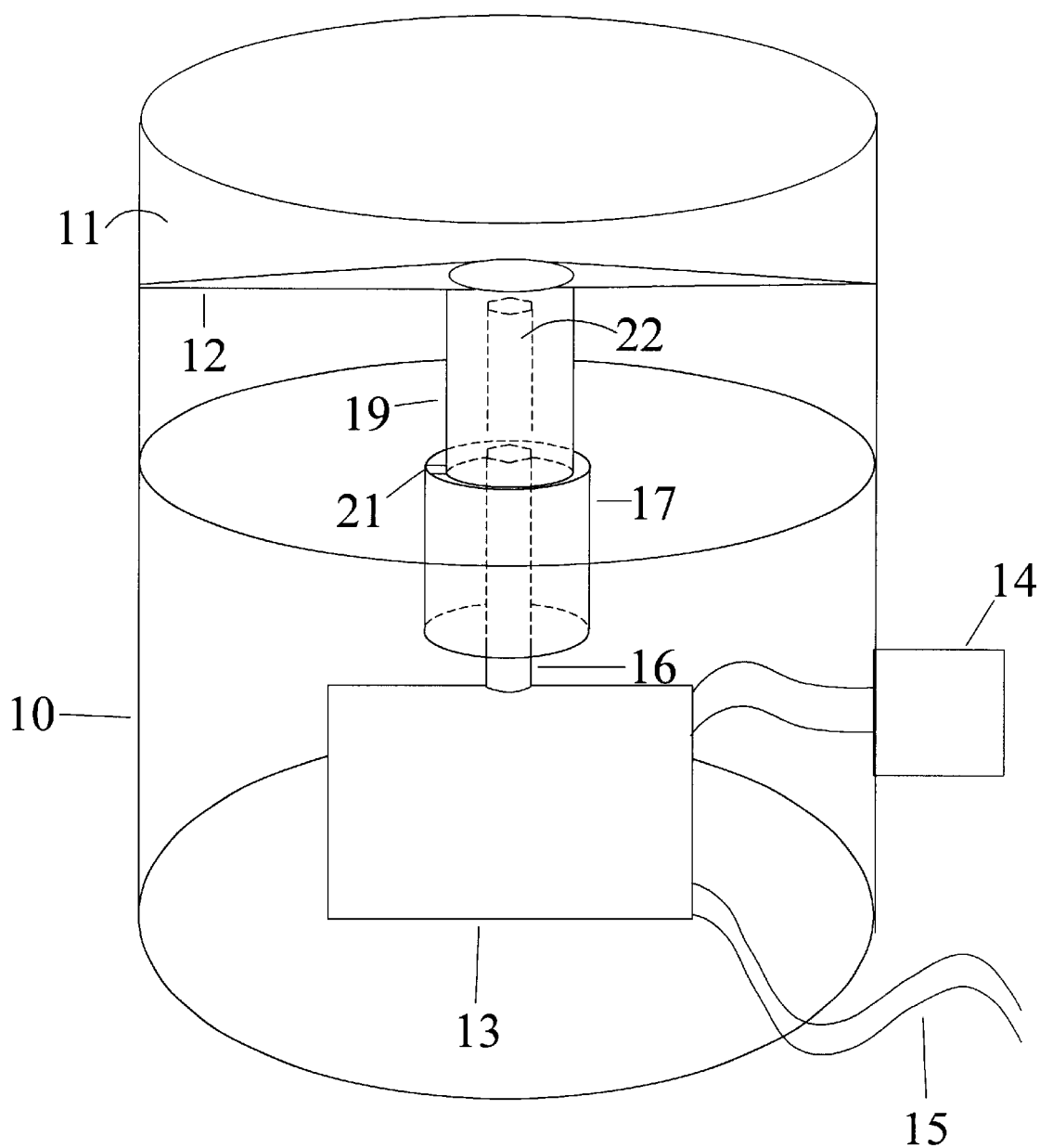
FIG. 2 illustrates the food processor (blade in "up" position), with a cutaway view of the mechanism that adds up-and-down motion to rotational motion.
Figure 3:
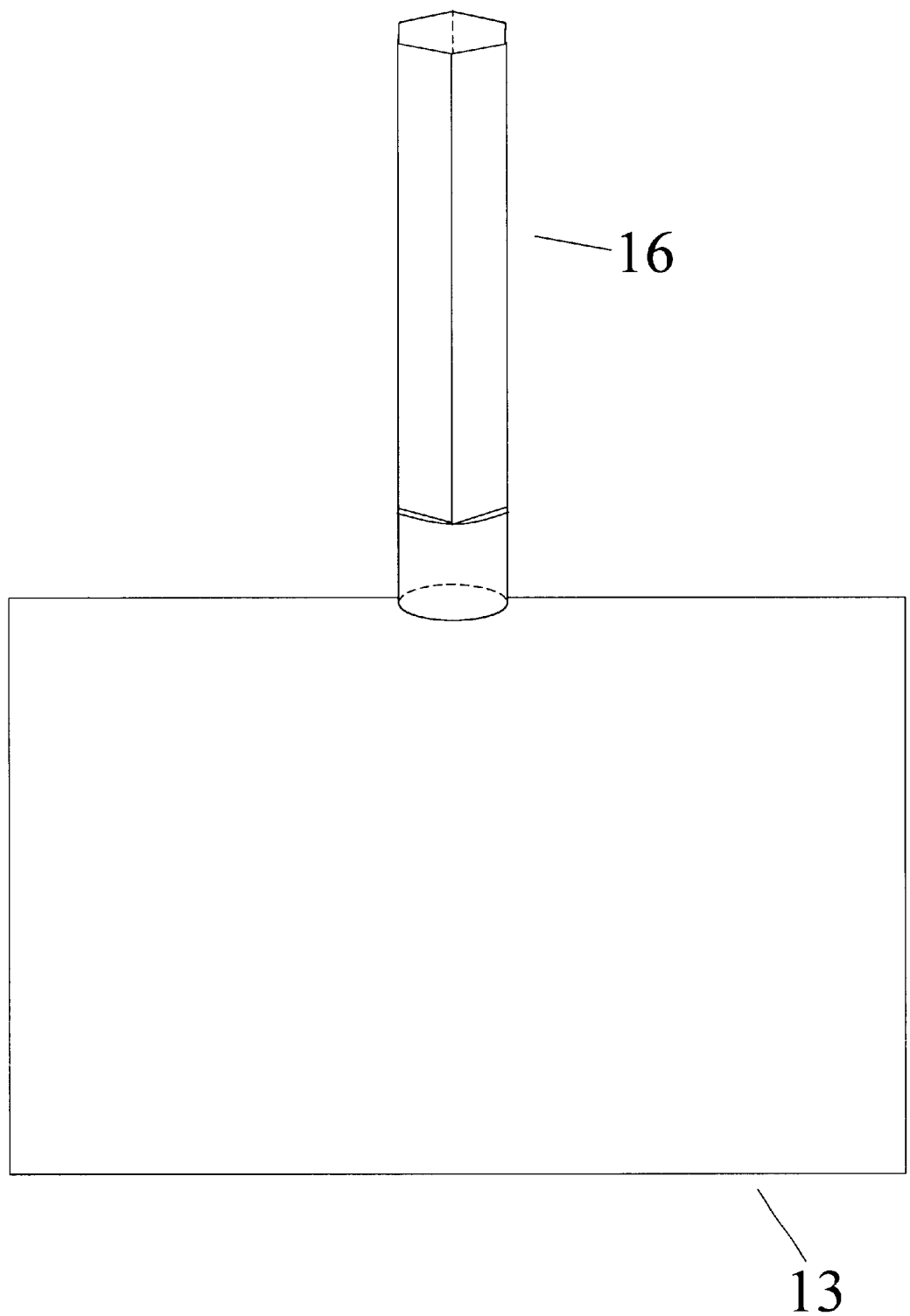
FIG. 3 details the drive shaft, illustrating the hexagonal nature of its upper section.

As shown in FIGS. 1 and 2, the device is comprised of a main body 10, a comminuting chamber 11, and a blade 12.

A motor 13 is contained within main body 10, and controls 14 and power cord 15 are associated with motor 13. A cylindrical drive shaft 16 extends from motor 13. The upper section of drive shaft 16 has a hexagonal cross-section.

Figure 4:
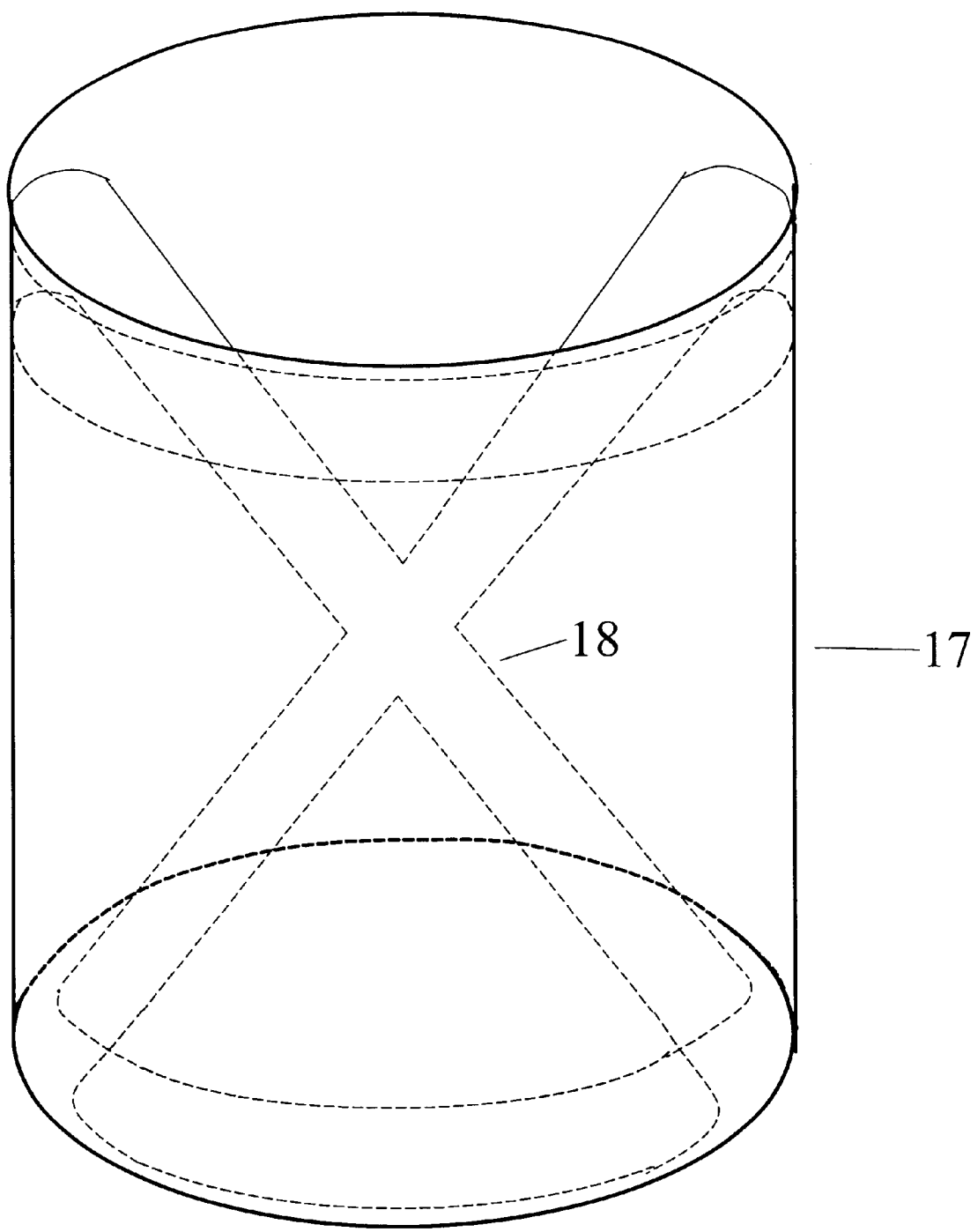
FIG. 4 provides further detail of the threaded cylinder.
Figure 5:
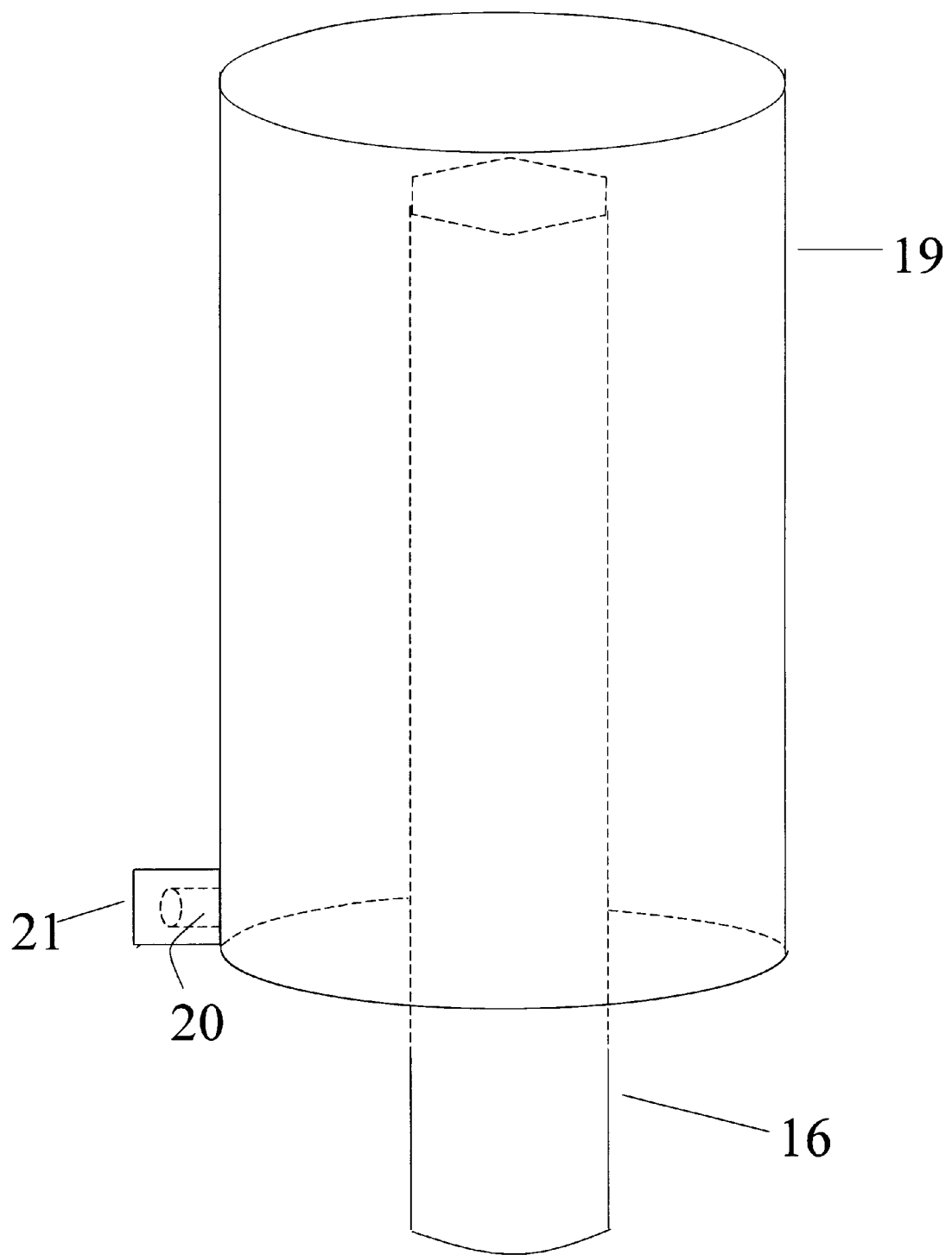
FIG. 5 provides further detail of the post and member.

A cylinder 17, open at both ends, is fixed to main body 10. A thread 18 is located around the inner surface of cylinder 17. As detailed in FIG. 4, thread 18 forms a continuous loop beginning at the bottom of cylinder 17, extending in a spiral fashion to the top of cylinder 17, and returning in a reverse spiral fashion to the bottom of cylinder 17.

A cylindrical lifting element 19 fits inside cylinder 17, and has a post 20 and a member 21 located thereon. Post 20 and member 21 on lifting element 19 fit into thread 18 on cylinder 17. Member 21 has a center hole slightly larger in diameter than post 20, such that member 21 fits over post 20 and is movable about post 20. Member 21 is slightly longer than the width of thread 18, to smooth the passage of member 21 through intersections in thread 18.

A hole 22 is centrally located through the axis of lifting element 19, and extends from the bottom into the interior of lifting element 19. Hole 22 is hexagonal in cross-section, and is suitably sized to engage the upper section of drive shaft 16 while allowing lifting element 19 to move up and down on the upper section of drive shaft 16. Blade 12 is removably attached to the top of lifting element 19.

OPERATION—Main Embodiment

The action of motor 13 influences drive shaft 16 to rotate. Since lifting element 19, post 20, member 21, and blade 12 are all drivably coupled to drive shaft 16, they rotate as well.

The rotating action of lifting element 19 influences post 20 and member 21 to move in an upward direction along thread 18. Since lifting element 19 and blade 12 are connected to post 20 and member 21, they move in an upward direction as well.

Lifting element 19, post 20, member 21, and blade 12 continue to move in an upward direction until they reach their highest positions, illustrated in FIG. 2, wherein post 20 and member 21 are engaged in the uppermost part of thread 18.

As lifting element 19, post 20, and member 21, and blade 12 continue to rotate, they begin to move down the reverse spiral of thread 18. Lifting element 19, post 20, member 21, and blade 12 continue to move in a downward direction until they reach their lowest positions, illustrated in FIG. 1, wherein post 20 and member 21 are engaged in the lowermost part of thread 18.

The up-and-down action described above repeats itself with subsequent rotations of drive shaft 16. Thus, lifting element 19, post 20, member 21, and blade 12 move repeatedly up and down while rotating. Drive shaft 16 does not, however, move up and down.

DESCRIPTION AND OPERATION—Alternative Embodiments

Figure 6:
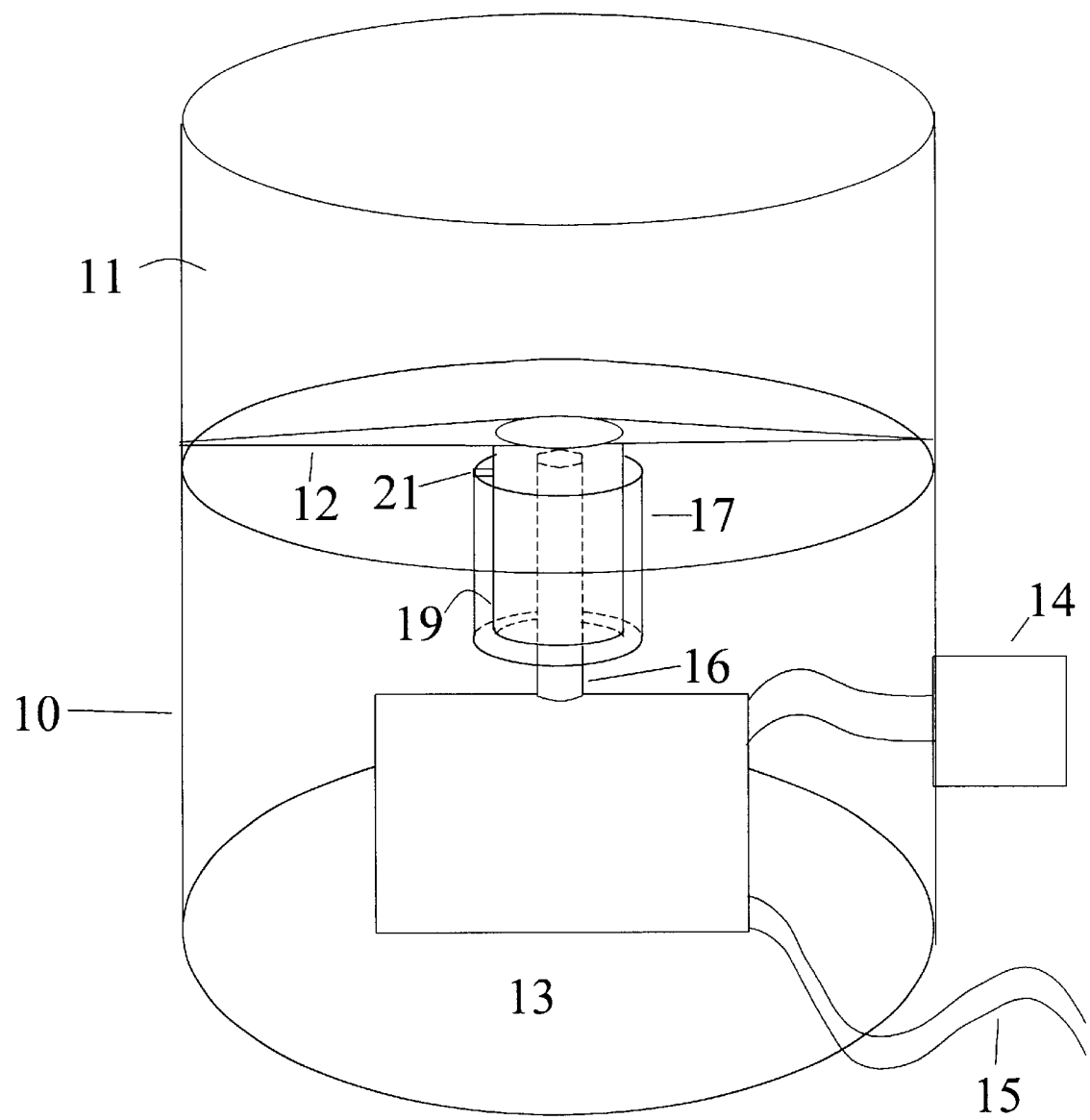
FIG. 6 illustrates an alternative embodiment, wherein the thread is on the lifting element and the post and member are on the cylinder.

Version with the Thread on the Lifting Element and the Post and Member on the Cylinder:

FIG. 6 illustrates an alternative embodiment, wherein thread 18 is located around the outer circumference of lifting element 19, and post 20 and member 21 are located on cylinder 17. As lifting element 19 rotates, post 20 and member 21, which are engaged in thread 18, influence lifting element 19 and blade 12 to move in an upward direction. Post 20 and member 21, being fixed to cylinder 17 and thus main body 10, do not move up and down.

Lifting element 19 and blade 12 continue to move in an upward direction until they reach their highest positions, wherein post 20 and member 21 are engaged in the lowermost part of thread 18.

As lifting element 19 and blade 12 continue to rotate, post 20 and member 21 influence lifting element 19 and blade 12 to move in an downward direction. Lifting element 19 and blade 12 continue to move in a downward direction until they reach their lowest positions, wherein post 20 and member 21 are engaged in the uppermost part of thread 18.

The up-and-down action described above repeats itself with subsequent rotations of drive shaft 16. Thus, lifting element 19 and blade 12 move repeatedly up and down while rotating. Other parts, as well as other operating steps, are the same as in the main embodiment.

Figure 7:
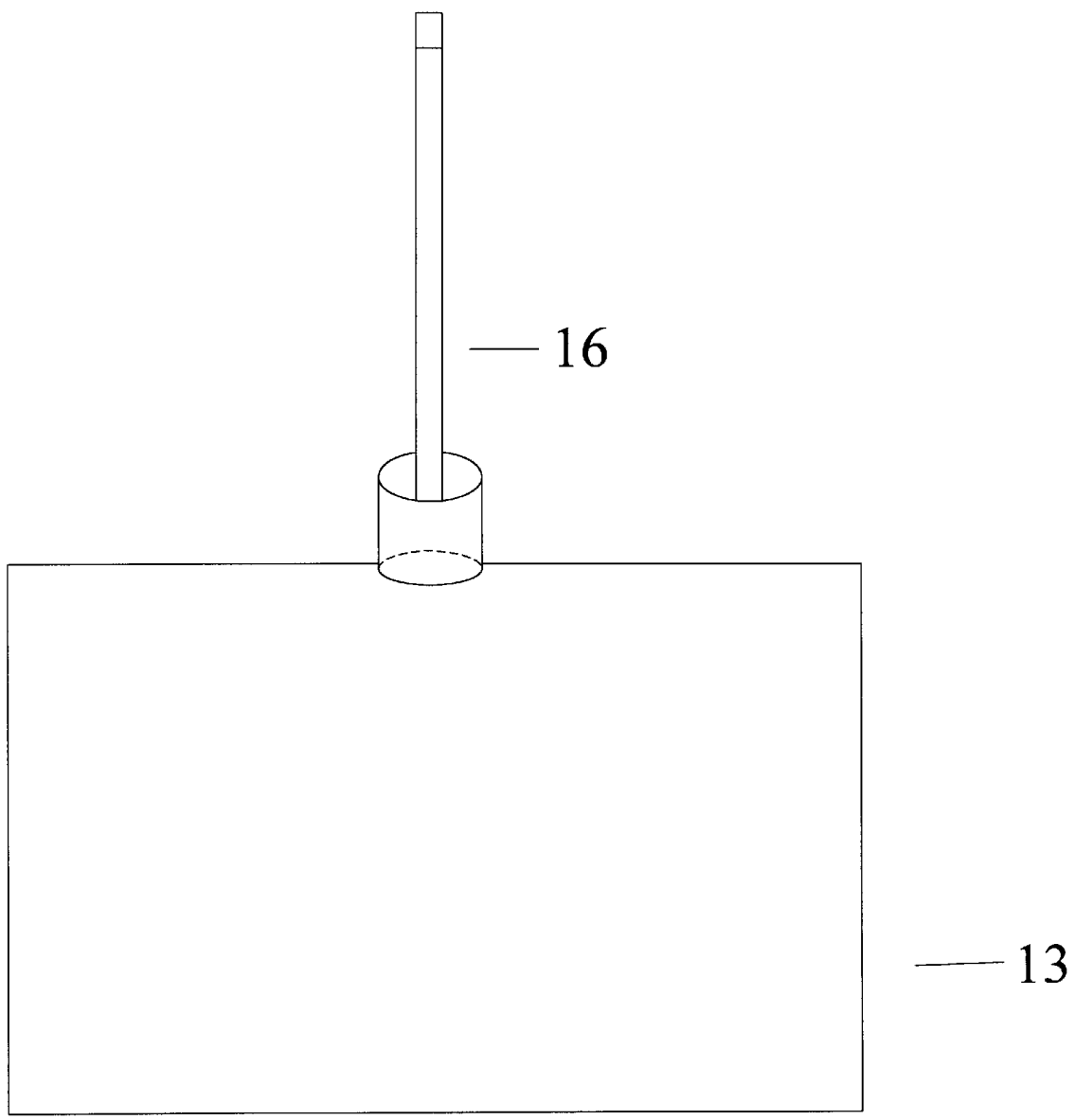
FIG. 7 illustrates an alternative embodiment, wherein the upper section of the drive shaft has a different shape.

Version with a Differently-shaped Upper Section of Drive Shaft:

FIG. 7 illustrates an alternative embodiment, wherein the upper section of drive shaft 16 has a tongue-like shape, rather than hexagonal as in the main embodiment. Hole 22 has a corresponding slot-like shape. The tongue-shaped upper section of drive shaft 16 fits into the slot-shaped hole 22, to drivably couple lifting element 19 to drive shaft 16. Other parts, as well as other operating steps, are the same as in the main embodiment.

Figure 8:
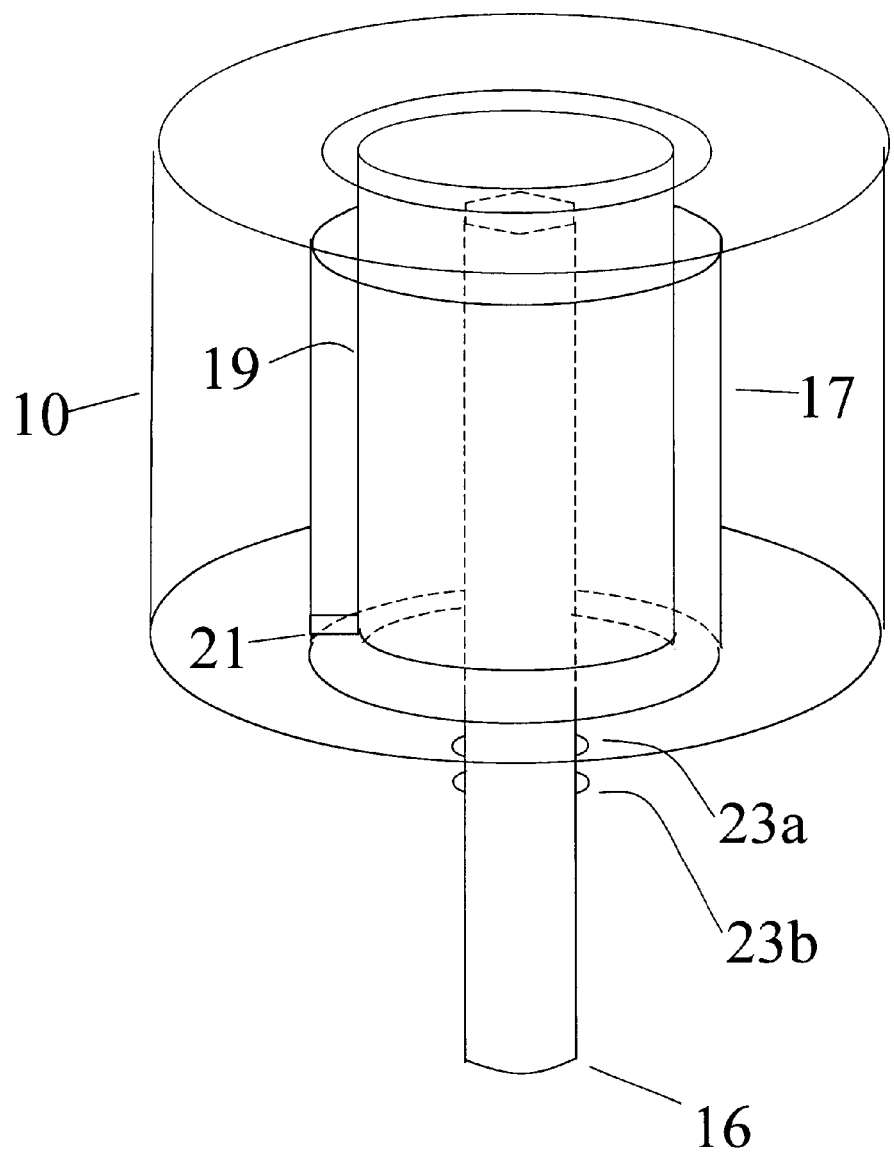
FIG. 8 illustrates a separate, free-standing assembly containing the mechanism that adds up-and-down motion to rotational motion.

Version with Mechanism Contained within a Separate, Free-standing Assembly:

FIG. 8 illustrates an alternative embodiment, wherein the mechanism that adds up-and-down motion to rotational motion is contained within a separate, free-standing assembly. Main body 10 surrounds cylinder 17 and lifting element 19. Two snap rings 23a&b fit onto drive shaft 16, locking drive shaft 16 into main body 10. Drive shaft 16 is not connected to a motor, and lifting element is not connected to a blade.

To operate, rotational motion is applied to drive shaft 16. Lifting element 19 acts as the output shaft of the mechanism, and moves up and down while rotating. Other parts, as well as other operating steps, are the same as in the main embodiment.

Figure 9:
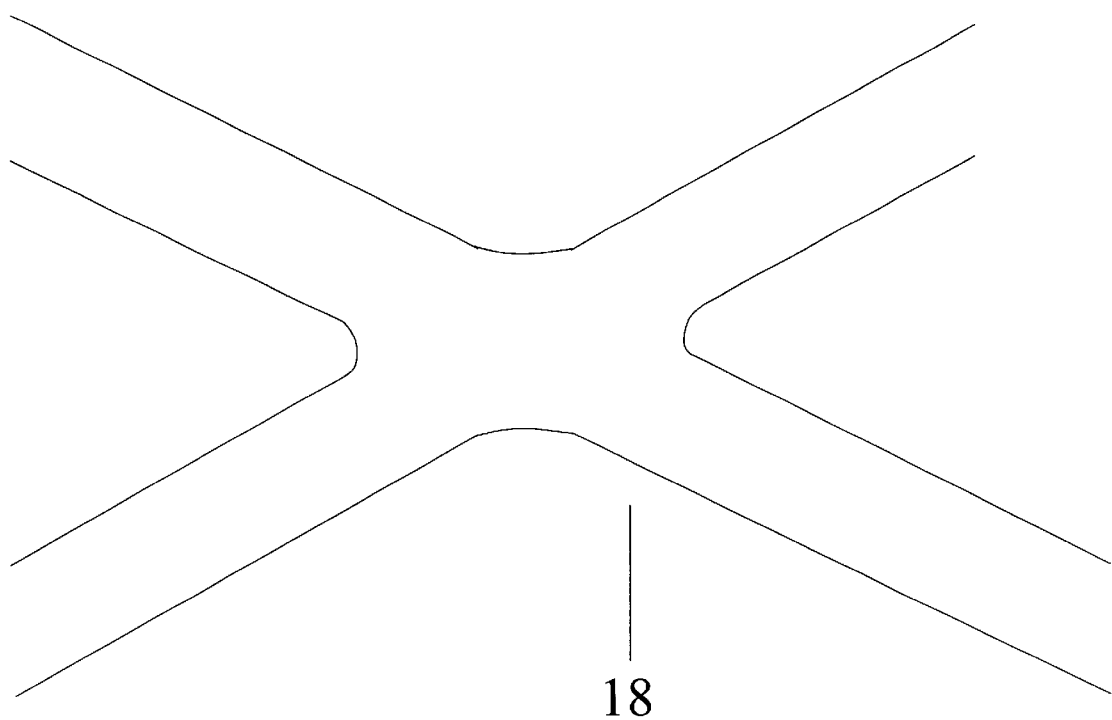
FIG. 9 illustrates an alternative embodiment, a version with tapered surfaces at thread intersections.

Version with Tapered Surfaces at Thread Intersections:

FIG. 9 illustrates an alternative embodiment, wherein tapered surfaces are used around thread intersections, to smooth the passage of the post and member through those intersections. Other parts, as well as other operating steps, are the same as in the main embodiment.

CONCLUSIONS, RAMIFICATIONS, AND SCOPE

Thus the reader will see that this invention has an improved comminuting action versus prior art processors.

While my above descriptions contain many specificities, these shall not be construed as limitations on the scope of the invention, but rather as exemplifications of various embodiments thereof. Many other variations are possible. For example:

The cylinder and lifting element may be of various lengths, to generate various amounts of up-and-down motion.

Various different thread patterns may be used, to influence the lifting element to move up and down differently as it rotates. For example, if the thread is in a horizontal plane for a longer distance at the top and bottom of the cylinder, to smooth the rotational and up-and-down motion of the blade, the blade will, on average, move up and down fewer times per rotation than in the main embodiment. In addition, there will be more intersections in the spiral-reverse spiral pattern of the thread.

As another example, if the thread has a lesser pitch, the blade will, on average, move up and down fewer times per rotation than in the main embodiment. In addition, there will be more intersections in the spiral-reverse spiral pattern of the thread.

The tread width can be made slightly greater at various points, to smooth the passage of the post and member as they travel up and down the thread.

The member may be of various lengths and shapes, provided that it travels smoothly up and down the thread and passes smoothly through any thread intersections.

The member may be omitted, leaving the post to engage the thread by itself. In this instance, the post must be suitably sized and shaped to travel smoothly up and down the thread and pass smoothly through any thread intersections. To reduce friction, the post may be configured to permit it to rotate within its anchoring means, either on the lifting element or on the cylinder.

Various antifriction means, such as ball, roller, or needle bearings, may be used to reduce friction between contact surfaces within the mechanism, and smooth out the rotational and up-and-down motion of the processor blade. Beveling or rounding contact surfaces within the mechanism would also aid in reducing friction.

Various other means, which would be known to those of ordinary skill in the art, may also be used to ensure that the post and member, or post alone, travels smoothly up and down the thread and passes smoothly through any thread intersections.

In the alternative embodiment illustrated in FIG. 6, a cylinder is not necessary—just a post and member, or post alone, fixed to the main body will suffice. The cylinder, however, does provide additional support to keep the lifting element aligned in a vertical plane.

The means of coupling the drive shaft to the lifting element may be different than that shown in the main embodiment. FIG. 7 illustrates one example, but there are many possible variations. It is important, however, that the coupling means permit the lifting element to move up and down on the drive shaft while rotating.

The diameters of the drive shaft, cylinder, lifting element, and hole may be different than indicated in the main and alternative embodiments. However, parts which are intended to fit together, or through each other, must suitably do so.

Various sealing and shielding means may be used to ensure that comminuted material does not enter the mechanism, and to make cleaning easy.

The parts may be manufactured from various materials, including various metals and plastics, or even wood.

Several of the parts may be of one-piece or multiple-piece construction. For example, the cylinder may be formed of one piece with main body, or the parts may be manufactured separately and attached together later. As another example, the lifting element may be formed of one piece with the post, or the parts may be manufactured separately and attached together later.

The basic concept of adding up-and-down motion to rotational motion is applicable to blenders and other types of rotary mixers or comminutors.

Accordingly, the scope of the invention should be determined not by the embodiments illustrated, but by the appended claims and their legal equivalents.

I claim:

1. A comminuting device, comprising:

a) a rotatable drive shaft, b) a first part drivably coupled to said drive shaft, and axially translatable along said drive shaft, c) a comminuting element attached to said first part, d) a second part, e) threaded means located on said first and second parts for influencing said first part to alternately move up and down along said drive shaft, wherein rotating the drive shaft in one direction simultaneously rotates and translates the comminuting element axially up and down the threaded means.

2. The device of claim 1, wherein said second part is a cylinder, and said threaded means comprise a continuous thread located on said cylinder and a guiding element located on said first part, said guiding element operatively engaging said continuous thread.

3. The device of claim 2, wherein said guiding element is comprised of a post and member.

4. The device of claim 2, wherein said guiding element is comprised of a post.

5. The device of claim 1, wherein said second part is a cylinder, and said threaded means comprise a continuous thread located on said first part and a guiding element located on said cylinder, said guiding element operatively engaging said continuous thread.

6. The device of claim 5, wherein said guiding element is comprised of a post and member.

7. The device of claim 5, wherein said guiding element is comprised of a post.

8. A transmission mechanism, comprising:

a) a rotatable drive shaft, b) a first part drivably coupled to said drive shaft, and axially translatable along said drive shaft, c) a second part, d) threaded means located on said first and second parts for influencing said first part to alternately move up and down along said drive shaft, wherein rotating the drive shaft in one direction simultaneously rotates and translates the first part axially up and down the threaded means.

9. The device of claim 8, wherein said second part is a cylinder, and said threaded means comprise a continuous thread located on said cylinder and a guiding element located on said first part, said guiding element operatively engaging said continuous thread.

10. The device of claim 9, wherein said guiding element is comprised of a post and member.

11. The device of claim 9, wherein said guiding element is comprised of a post.

12. The device of claim 8, wherein said second part is a cylinder, and said threaded means comprise a continuous thread located on said first part and a guiding element located on said cylinder, said guiding element operatively engaging said continuous thread.

13. The device of claim 12, wherein said guiding element is comprised of a post and member.

14. The device of claim 12, wherein said guiding element is comprised of a post.

* * * * *